United States Patent
Wardman et al.

(10) Patent No.: US 11,522,911 B2
(45) Date of Patent: *Dec. 6, 2022

(54) PASSIVE AND ACTIVE IDENTITY VERIFICATION FOR ONLINE COMMUNICATIONS

(71) Applicant: PayPal, Inc., San Jose, CA (US)

(72) Inventors: Bradley Wardman, Phoenix, AZ (US); Jakub Ceiran Burgis, Houwald (LU); Nicole Harris, Mesa, AZ (US); Blake Butler, Scottsdale, AZ (US); Nathan Robert Pratt, Scottsdale, AZ (US); Kevin James Tyers, Chandler, AZ (US)

(73) Assignee: PAYPAL, INC., San Jose, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/234,388

(22) Filed: Apr. 19, 2021

(65) Prior Publication Data

US 2021/0258345 A1  Aug. 19, 2021

Related U.S. Application Data

(63) Continuation of application No. 15/858,867, filed on Dec. 29, 2017, now Pat. No. 10,986,123.

(51) Int. Cl.
| | |
|---|---|
| *H04L 29/06* | (2006.01) |
| *H04L 9/40* | (2022.01) |
| *H04L 51/046* | (2022.01) |
| *H04L 67/306* | (2022.01) |
| *G06F 40/279* | (2020.01) |

(52) U.S. Cl.
CPC ........ *H04L 63/1483* (2013.01); *H04L 51/046* (2013.01); *H04L 63/102* (2013.01); *H04L 63/145* (2013.01); *H04L 67/306* (2013.01); *G06F 40/279* (2020.01)

(58) Field of Classification Search
None
See application file for complete search history.

(56) References Cited

U.S. PATENT DOCUMENTS

| | | | | |
|---|---|---|---|---|
| 9,491,200 | B2 * | 11/2016 | Mardikar | ........ G06F 21/62 |
| 2006/0080084 | A1 * | 4/2006 | Shuster | ........ G06Q 10/00 |
| | | | | 707/E17.058 |
| 2018/0152471 | A1 * | 5/2018 | Jakobsson | ........ G06Q 50/01 |

* cited by examiner

*Primary Examiner* — Andrew J Steinle
(74) *Attorney, Agent, or Firm* — Haynes and Boone, LLP

(57) ABSTRACT

Methods, systems, and computer program products for performing passive and active identity verification in association with online communications. For example, a computer-implemented method may include receiving one or more electronic messages associated with a user account, analyzing the electronic messages based on a plurality of identity verification profiles associated with the user account, generating an identity trust score associated with the electronic messages based on the analyzing, determining whether to issue a security challenge in response to the electronic messages based on the generated identity trust score, and issuing the security challenge in response to the electronic messages based on the determining.

20 Claims, 5 Drawing Sheets

PASSIVE AND ACTIVE IDENTITY VERIFICATION FOR ONLINE COMMUNICATIONS

PRIORITY DATA

This present application is a continuation of U.S. patent application Ser. No. 15/858,867, filed on Dec. 29, 2017, now U.S. Pat. No. 10,986,123, issued on Apr. 20, 2021, the disclosure of which is hereby incorporated in its entirety.

TECHNICAL FIELD

The present disclosure generally relates to computer systems and, more particularly, to the security of computer systems, computer networks, and Internet services.

BACKGROUND

Cybercrime generally refers to criminal activity involving computer systems. Such criminal activity includes the unauthorized use of computer systems to perpetrate crimes and illegally access private electronic data. Cybercriminals may gain access to private user account information in a number of ways. For example, cybercriminals may obtain user account credentials and information by exploiting weaknesses in various computer systems, by infiltrating local computer systems of users, by tricking users into providing account information, by stealing user account information directly from a company, or by intercepting user account information traveling over a network.

Cybercriminals have found ways to automate illegal activities involving computer systems and computer networks. For example, cybercriminals may use automated scripts to carry out some or all of their criminal activity. Automated scripts generally can be executed much faster and in greater number than human effort alone. In addition, there has been growing concern regarding the use of "bots" in automating online criminal activity.

Internet or web robots (i.e., "bots") generally refer to specialized software applications that run automated tasks and scripts over the Internet. Traditionally, bots have been used to perform simple and structurally repetitive tasks at a higher rate than humans. More recently, bots have become increasingly sophisticated with the use of artificial intelligence. As such, it may be difficult to distinguish between a criminal bot and a legitimate user in online communications.

Accordingly, improved methods of detecting and preventing automated cybercrime are of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
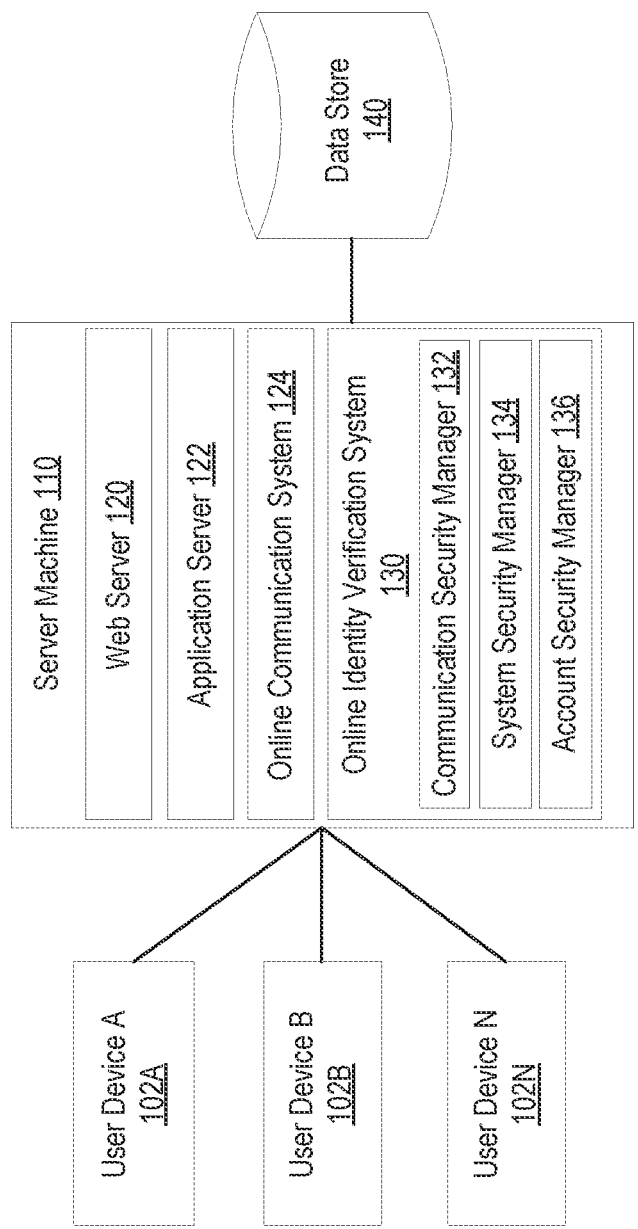
FIG. 1 is a block diagram illustrating a system architecture, in accordance with various examples of the present disclosure.

Systems, methods, and computer program products for providing passive and active identity verification in online communications are disclosed. The number and severity of known and unknown data breaches have increased dramatically in recent years, costing consumers, business, and governments billions of dollars. In addition, cybercriminals continue to develop new and technologically sophisticated ways of stealing and monetizing private user data.

In examples of the present disclosure, an online identity verification system performs online identity verification on one or more online communications from a user. In some examples, the online identity verification system analyzes online communications associated with a user account via a web chat session. In addition, the identity verification system also may evaluate any other type of electronic communication between different parties, such as text, email, social media posts, etc. As such, examples of the present disclosure may be used broadly and are not limited to any particular type or types of electronic communications.

In some examples, an identity verification system generates and maintains one or more profiles for a user based on past communications to evaluate future online messages that appear to have originated from the user. For example, the identity verification system may generate and maintain a communication profile for the user based on previously observed typing patterns, statistics, and/or error rates. The identity verification system also may generate and maintain a grammatical profile for the user based on previously observed grammatical accuracies, inaccuracies, and idiosyncrasies. In addition, the identity verification system may generate and maintain a vernacular profile for the user based on previous online communication from the user and/or geographical information associated with the user. Such profiles then may be used, in whole or in part, to generate an online identity verification trust score and/or risk score for subsequent online communications appearing to come from the user.

In some examples, an online identity verification system receives one or more subsequent electronic messages associated with the user and analyzes the electronic messages based on one or more the existing identity verification profiles. The online identity verification system then generates an identity trust score associated with the new electronic messages and/or an associated online user session. The trust score then may be used to determine whether to allow a pending or existing online communication to proceed, to issue a security challenge in response to the messages and/or to take one or more security related actions involving the user's account.

In some examples, an online identity verification system issues a security challenge in response to the electronic messages and performs one or more security-related actions in response to a result of the security challenge. For example, the online identity verification system may issue one or more additional security challenges in an online session and/or allow a user to proceed in an online communication session when a level of trust has been achieved. In addition, the online identity verification system also may perform one or more risk mitigation activities associated with the user's account based on a result of the security challenge. For example, the online identity verification system may alert the user electronically via another channel of suspicious activity, temporarily lock or disable the user's account, limit a number of transactions involving an account, and/or limit value of one or more transactions associated with an account.

Accordingly, aspects of the present disclosure provide various ways of analyzing and evaluating online communications to detect and prevent impersonation of a legitimate user and/or other online criminal activity. As such, examples of the present disclosure provide increased speed and accuracy in detecting and preventing various forms of automated criminal activity carried out over computer networks and the Internet.

FIG. 1 illustrates an exemplary system architecture 100 in which examples of the present disclosure may be implemented. System architecture 100 includes a plurality of user devices 102A, 102B, 102N of different users, one or more server machines 110, and one or more data stores 140, connected via one or more networks (not shown).

Networks may be a public network (e.g., the Internet), a private network (e.g., local area network (LAN) or wide area network (WAN)), or any combination thereof. In an example, networks may include the Internet, one or more intranets, wired networks, wireless networks, and/or other appropriate types of communication networks. Networks also may comprise a wireless telecommunications network (e.g., cellular phone network) adapted to communicate with other communication networks, such as the Internet. In addition, networks may include one or more short-range wireless networks.

In general, user devices 102A-102N may include and/or be associated with one or more computing devices, such as server machines, personal computers (PC), laptops, smart phones, tablet computers, server computers, wearable computing devices, and/or any other type of computing device or machine. User devices 102A-102N may run an operating system (OS) that manages hardware and software of a respective device. A browser (not shown) may run on user devices 102A-102N (e.g., on an operating system of a user device 102A). The browser may be a web browser that can access content and services provided by a web server 120 of server machine 110. Further, other types of software applications running on respective user devices 102A-102N may provide access to content and services of server machine 110 without use of a web server 130 or browser.

One or more server machines 110 each may include one or more web servers 120, one or more application servers 122, and/or one or more online communication systems 124. For example, web servers 120 may provide text, audio, image, and video content to and from server machines 110, and/or other computer system or communication channels. Web servers 120 also may provide web-based application services, business logic, and updates to server machines 110, user devices 102A-102N, and/or other computer systems.

In some examples, web servers 120 are coupled to one or more respective application servers 122 that provide application services, data, business logic, and/or APIs to various server machines 110, user devices 102A-102N, and/or other computer systems. In other examples, application servers 122 may provide one or more such services independently, without use of web servers 120.

In some examples, web servers 120 may provide server machines 110, user devices 102A-102N, and/or other any system with access to one or more application server 122 services associated with an online communication system 124 and/or an online identity verification system 130. For example, such functionality may be provided as part of one or more different web applications, standalone applications, systems, plug-ins, web browser extensions, application programming interfaces (APIs), etc. In some examples, plug-ins and extensions generally may be referred to, individually or collectively, as "add-ons."

In some examples, user devices 102A-102N and/or other types of client and server computer systems may include and/or execute an application associated with a service provided by one or more server machines 110 (e.g., online communication system 124, online identity verification system 130, etc.). For example, various types of computing devices (e.g., smart phones, smart televisions, tablet computers, smart wearable devices, smart home computer systems, etc.) may use specialized applications to access services provided by server machines 110, to issue commands to server machines 110, and/or to receive content from server machines 110 without visiting or using web pages.

Data stores 140 generally may refer to persistent storage capable of storing various types of data, such as text, audio, video, and image content. In some examples, data stores 140 may include a network-attached file server, while in other examples data stores 160 may include other forms of persistent storage such as a relational database, an object-oriented database, and so forth.

One or more server machines 110 each may include one or more online communication systems 124. Online communication system 124 generally refer to any type of software application and/or physical or virtual computer system that provides communication-related services allowing two or more parties to communicate over a private network and/or the Internet. Examples of online communication systems generally may include, and are not limited to, online chat systems, electronic mail systems, text messaging systems, video conferencing systems, collaboration systems, project team rooms, social media platforms, virtual reality computer systems, augmented reality computer systems, and/or any computer system that allows written, verbal, and/or visual communication among various parties. Such communications may be synchronous, asynchronous, session-based, not session-based, and/or combined in various arrangements.

In various examples, online communication system 124 generally may be an online chat or messaging system that allows transmission of text messages between at least two parties, such as a sender and a receiver, over a network. In some examples, online communication system 124 may integrate chat services with one or more of audio, video, content, social media, payment services, and/or other such enhancements. Further online communication system 124 may perform and/or utilize transcription services, for example, using one or more forms of natural language processing to convert data between audio and text.

In various examples, online communication system 124 provides one or more communication services to user devices 102A-102N. For example, online communication system 124 may provide such communication services with and/or without the use of client software applications. In some examples, online communication services may be provided directly to user devices 102A-102N by online communication system 124, for example, via a web browser. In some examples, one or more client software applications may be installed and/or executed on respective user devices 102A-102N in association with online communication system 124, allowing users to send and receive online communications in association with one or more other parties. As such, online communication system 124 generally may include client/server, peer-to-peer, and/or web based application software. However, online communications generally are not limited to any particular computer system or software architecture.

In various examples, online communication system 124 allows multiple users to communicate via an online chat session. Such communication may occur, for example, between two or more humans, two or more web robots, and/or a combination of two or more parties that includes at least one human and at least one web robot. In some cases with online communications, one party may attempt to impersonate a user. For example, a criminal may attempt to impersonate another user to gather information via social engineering and/or to exploit a user account. Similarly, a criminal also may program, build, configure, and/or otherwise utilize one or more web robots (i.e., "bots") in an automated and/or semi-automated manner to impersonate other users and perform criminal activities online.

Traditionally, businesses generally have provided users with the option of contacting a customer service agent via telephone to initiate service, ask questions, request services, and/or resolve issues with a user account. For example, customer service representatives at a call center generally answer telephone calls, ask a series of preliminary authentication and/or verification questions according to a call center script, and proceed with assisting a caller once the caller and/or an account has been verified.

Today, many businesses still provide telephone customer service to users. In addition, users may choose to perform account activities on a self-service basis via the Internet. Further, a growing number of businesses provide users with the option of online customer service via an online chat session. Thus, a user may initiate an online chat with a representative of a business, for example, to request service, to create an account, to modify existing account, to ask questions, to resolve one or more issues, to purchase additional services, etc. Businesses also may provide other types of online support via email, text, social media, and/or via any other form of communication service that allows two or more parties to send and receive communications.

In some examples, online customer service chat sessions may be initiated or run at one or more times by a "friendly" bot. For example, friendly bots may have access to customer service dialog scripts, be programmed, and/or otherwise be equipped with artificial intelligence that allow the friendly bots to carry out online chat sessions with users and to perform activities associated with a user account, just as if a human customer service agent was doing the same.

In some examples, friendly bots may be used to offload some routine aspects of providing customer service via online chat sessions. In some examples, online customer service chat sessions may be transferred and/or switched between friendly bots and/or human agents at one or more times for any reason. For example, a friendly bot initially may provide customer service via an online chat session until one or more events occur, such as a security exception, an incorrect response to a security challenge, a complex customer service request, and/or an unidentified request.

In response, an online chat session may be transferred to a human agent. Further, data that has been collected and observed throughout an online chat session may be shared and used across one or more friendly bots and/or human agents associated with a session. In addition, one or more communications received via an online chat session and/or any other type of online communication may be analyzed to detect fraud, to authenticate a user actively and/or passively, to verify the identity of a user actively and/or passively, and/or to generate, maintain, and adjust one or more security and/or identity verification profiles associated with a user account.

One or more server machines 110 each may include online communication system 124 and/or online identity verification system 130. Online identity verification system 130 may include one or more of a communication security manager 132, a system security manager 134, and/or an account security manager 136, which may be combined, divided, and organized in various arrangements on one or more computing devices. Various features of and services provided by online identity verification system 130, communication security manager 132, system security manager 134, and account security manager 136 are described in further detail below in association with FIGS. 2-4.

Figure 2:
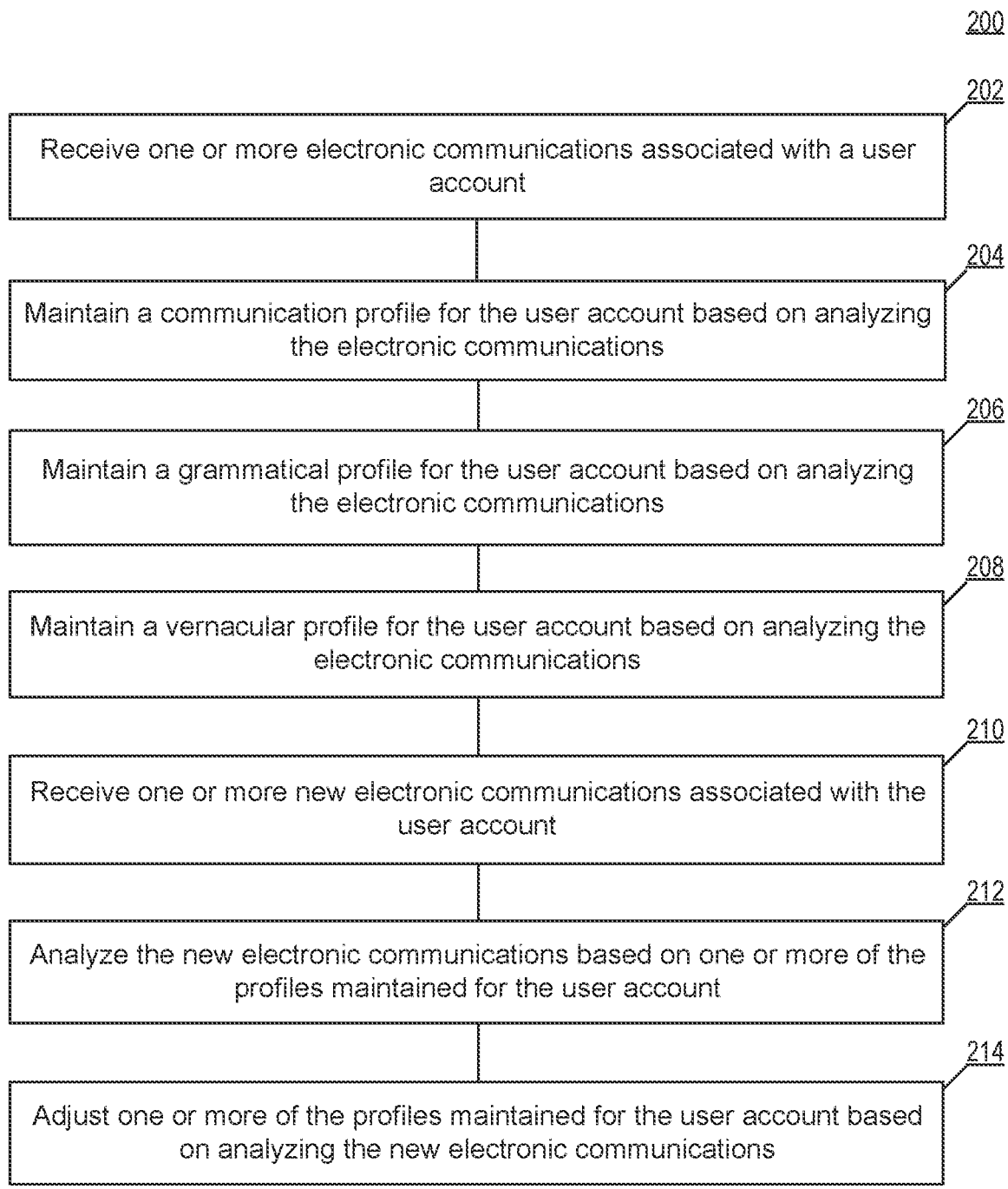
FIG. 2 is a flow diagram for maintaining one or more communication-related identity verification profiles for a user account, in accordance with examples of the present disclosure.

FIG. 2 is a flow diagram for maintaining one or more communication-related identity verification profiles for a user account. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof.

Method 200 begins at block 202 when communication security manager 132 of online identity verification system 130 receives one or more electronic communications associated with a user account. In various examples, communication security manager 132 receives one or more session-based or general online messages from a user in association with a user account. For example, communication security manager 132 may receive any number of synchronous and/or asynchronous online messages over any one or more periods of time in association with a user. Online communications may include, and are not limited to, text messages, emails, transcribed voice messages, SMS messages, MMS messages, messages associated with online payments such as message-based payments, chat session messages, etc.

In various examples, communication security manager 132 analyzes online messages received from a user based on one or more security and/or fraud detection models to generate, maintain, and/or periodically adjust one or more online identity verification profiles for each user. For example, communication security manager 132 may generate and maintain one or more of a data input security profile, a grammatical security profile, and/or a vernacular security profile over time based on online messages received from a user. Such identity verification profiles then may be used later, at one or more times, to determine whether subsequent online communications received from the user are not from the claimed sender, not likely from the claimed sender, somewhat likely from the claimed sender, very likely from the claimed sender, or actually from the claimed sender.

At block 204, communication security manager 132 of online identity verification system 130 maintains a communication profile for the user account based on analyzing the electronic communications. In various examples, a communication profile generally refers to various observed data and statistics associated with the input, typing, style, word usage, and/or accuracy associated with past and/or present communications of a user.

In various examples, communication security manager 132 analyzes online communications of a user contextually and/or statistically. In some examples, communication security manager 132 determines typing patterns and styles of a user to generate a passively-collected trust score for evaluating the authenticity of online communications received in association with a user or user account.

In some examples, communication security manager 132 collects and analyzes typing statistics associated with online communications of a user. For example, communication security manager 132 may collect and store user typing statistics associated with one or more of overall typing speed of a user, left hand typing speed, right hand typing speed, overall typing accuracy, overall typing inaccuracy, right hand typing accuracy, right hand typing inaccuracy, left hand typing accuracy, left hand typing inaccuracy, accuracy or inaccuracy when typing specific words or phrases, how frequently a user corrects typing mistakes, how frequently a user manually corrects typing mistakes, how frequently a user relies on autocorrect to fix typing mistakes, etc. Communication security manager 132 also may analyze online communications of the user to determine whether the user is right handed or left handed and which hand a user uses to type certain keys. For example, how frequently does a user type "t" and/or any other character(s) with their right hand vs. left hand. (e.g., frequently, always, or never—for one or more hands).

In some examples, communication security manager 132 collects and stores user typing statistics associated with keystroke patterns and typing rhythms of a user. For example, communication security manager 132 may determine timing statistics associated with combinations of keys, words, and/or phrases typed by a user. In some examples, communication security manager 132 determines how quickly or slowly a user types their first name, middle name, last name, one or more words and phrases, address, city, state, zip, names of family members, one or more parts of an email address (e.g. username@domain.com, "username" and/or "domain"), etc. Communication security manager 132 also may track a typing rhythm or cadence within, between, and/or throughout one or more particular words, phrases, and/or sentences.

In some examples, communication security manager 132 maintains statistics on how a user capitalizes words. For example, communication security manager 132 may track how frequently a user capitalizes words at the beginning of a sentence, how frequently a user capitalizes words that should be capitalized, how frequently a user capitalizes words that should not be capitalized, one or more particular words that a user sometimes or always tends to capitalize, etc. Communication security manager 132 also may rate, grade, and/or otherwise track the diversity of the user's vocabulary, a writing level or sophistication of a user, and/or one or more other metrics associated with a user's communication style.

In various examples, communication security manager 132 may maintain one or more communication identity verification profiles for each user. For example, communication security manager 132 may maintain typing communication statistics for a user based on any one or more and/or a combination of any one or more of time of day (e.g., morning, mid-day, night, etc.), time of the week (e.g, day of week, weekdays, weekend, holiday, etc.), location (e.g., home, work, mobile, public transit, dining, shopping, etc.), indicated and/or detected keyboard, keyboard region (e.g, U.S., East Asian, non-alphabetic, Cyrillic, etc.), keyboard style (e.g., ergonomic, non-ergonomic), keyboard size, device type (e.g., desktop, laptop, tablet, smart phone), speech recognition input, speech recognition program, etc.

In some examples, one or more keyboard types may be detected or inferred based on frequency of auto-correction system calls, automatic keyboard detection, device information, operating system information, etc.

In addition, communication security manager 132 also may build and maintain one or more user profiles for each user of a user account. For example, communication security manager 132 may maintain one or more user profiles for a husband using a joint online account while also maintaining one or more additional user profiles for a wife that shares the joint online account.

At block 206, communication security manager 132 of online identity verification system 130 maintains a grammatical profile for the user account based on analyzing electronic communications. In various examples, a grammatical profile generally refers to observations and statistics of how a user generally organizes clauses, words, and phrases in their online communications. For example, communication security manager 132 may generate, maintain, and adjust a grammatical security profile for a user based on one or more synchronous and/or asynchronous communications received from a user.

In various examples, a grammatical profile may indicate statistics and/or other information regarding a user's consistency in providing accurate and/or inaccurate grammar in online communications. For example, communication security manager 132 may a track one or more categories of grammatical consistency and/or inconsistency, such as subject-verb agreement, subject-object-verb usage, subject-verb-object usage, sentence punctuation, sentence fragments, missing or extra commas, missing or extra apostrophes, misplaced or dangling modifiers, vague pronoun references, incorrect word usage, run on sentences, correct or incorrect word abbreviations, colon mistakes, split infinitives, etc.

As such, communication security manager 132 may track one or more categories of grammatical consistency and/or inconsistency to develop a grammatical profile indicating grammatical tendencies of a user. In addition, communication security manager 132 may maintain multiple grammatical profiles for a user, for example, based on use of a particular keyboard, device, user interface, etc.

At block 208, communication security manager 132 of online identity verification system 130 maintains a vernacular profile for user account based on analyzing the electronic communications. In various examples, a vernacular profile generally refers to statistics and/or other associated data that indicates a user's tendency for using one or more words, phrases, sayings, slang, sounds, and/or language associated with the one or more particular countries, regions, states, or any other geographical area.

In various examples, communication security manager 132 may associate a user's vernacular profile with one or more geographic areas. For example, a vernacular profile may include language or from one or more geographic areas based on one or more address that is associated with a user's account. In some examples, a user's account may be associated with a street address located on the west coast. However, the user's account may have been associated with an address on the east coast for a period of time somewhere in the past. Therefore, it may be expected that the user could use both east coast and west coast vernacular in online communications. Furthermore, expected or anticipated vernacular usage may be weighted based on a length of time a user has spent in each of one or more geographic locations, how recently a user has resided within or visited a geographical location, etc.

In various examples, communication security manager 132 collects and analyzes vernacular language usage of a user in various online communications over time. For example, communication security manager 132 may track a user's particular preferences for using one or more different words to describe various items and experiences. For example, a user's vernacular profile may indicate, which word the user prefers to use when referring to a soft drink or cola. A user's vernacular profile also may indicate which of one or more words the user has used in the past to refer to a soft drink or cola. For example, soda, pop, coke, cola, soda pop, tonic, soft drink, and cold drink, are some of the words used to describe a sweetened, carbonated beverage in various geographic regions of the United States. In another example, sprinkles may sometimes may be referred to as "jimmies" or confetti in some geographic areas.

In various examples, a vernacular profile of a user may be used to determine whether incoming correspondence from the user, for example whether through an email or online chat, is consistent or inconsistent with one or more geographic locations, past residences, and/or past communications of the user.

At block 210, communication security manager 132 of online identity verification system 130 receives one or more new electronic communications associated with the user account. For example, communication security manager 132 may receive one or more new online communications of one or more different types. Such online communications may include, and are not limited to, online chat session messages, email messages, text messages, emails, transcribed voice messages, SMS messages, MMS messages, messages associated with online or message-based payments, chat session messages, social media messages, etc.

At block 212, communication security manager 132 of online identity verification system 130 analyzes the new electronic communications based on one or more of the profiles maintained for the user account. In various examples, communication security manager 132 analyzes the new online communications based on one or more identity verification profiles maintained for a user. User identity verification profiles may include any combination of one or more of a communication profile as described at block 204, a grammatical profile has described at block 206, and/or a vernacular profile as described at block 208.

In various examples, communication security manager 132 may generate an identity trust score associated with the new online messages. For example, an identity trust score may be generated based on analyzing new online messages from a user based on one or more different weighted and/or un-weighted components from one or more of a communication profile, grammatical profile, and/or a vernacular profile of a user. For example, new online messages received from a user may be scored based on existing identity verification profiles reflecting data and statistics associated with past verified, online messages received from the user.

Various aspects of the new online messages generally may be compared to identity verification profiles of a user and are given positive consideration when consistent or within a reasonable statistical range of past observations associated with online messages from the user. On the other hand, aspects of the new online messages that are inconsistent with previously collected data and statistics associated with the user (e.g., outside of acceptable statistical variation) generally may be given no weight and/or used to reduce an identity trust score.

In various examples, communication security manager 132 determines whether to issue a security challenge in response to the new online messages based on the generated identity trust score and/or one or more components making up an identity trust score that fall below one or more thresholds. In some examples, communication security manager 132 issues a security challenge in response to the new online messages when the identity trust score is below or falls below certain threshold (e.g., at the beginning of or during an online chat session).

In addition, communication security manager 132 then may perform one or more activities associated with a user account based on a result of the security challenge. For example, communication security manager 132 may alert a friendly bot, human agent, and/or an actual user of potential fraudulent activity, temporarily lock or disable a user account, limit a number of transactions involving a user account, and/or limit value of one or more transactions associated with a user account when receiving an incorrect response to one or more security challenges. On the other hand, communication security manager 132 may verify and allow continued communication without interruption when receiving a correct response to a security challenge and/or enough information to verify that the new online messages were sent by the actual user, rather than a criminal or bot.

At block 214, communication security manager 132 of online identity verification system 130 adjusts one or more of the profiles maintained for the user account based on analyzing the new electronic communications. In various examples, communication security manager 132 updates one or more identity verification profiles generated and maintained for a user based on past online communications using data and statistics collected in association with new online communications from the user. For example, communication security manager 132 may update one or more of the identity verification profiles in real-time, periodically, online, offline, in whole, in part, before verifying the new online messages, after verifying the new online messages, and/or generally at any time. Thus, as new online message data is collected in association with a user account over time, accuracy of the user identity verification profiles improves.

In some examples, online communications from various users may be used to update one or more identity verification profiles associated with a group of users, such as a general user population. Such general identity verification profiles may be used, for example, in addition to or in place of user-specific profiles. For example, identity verification profiles based on general observations of a collection of users may be used to perform online identity verification during a user's first one or more online interactions until there is enough online message data to accurate generate the user's identity verification profiles.

Figure 3:
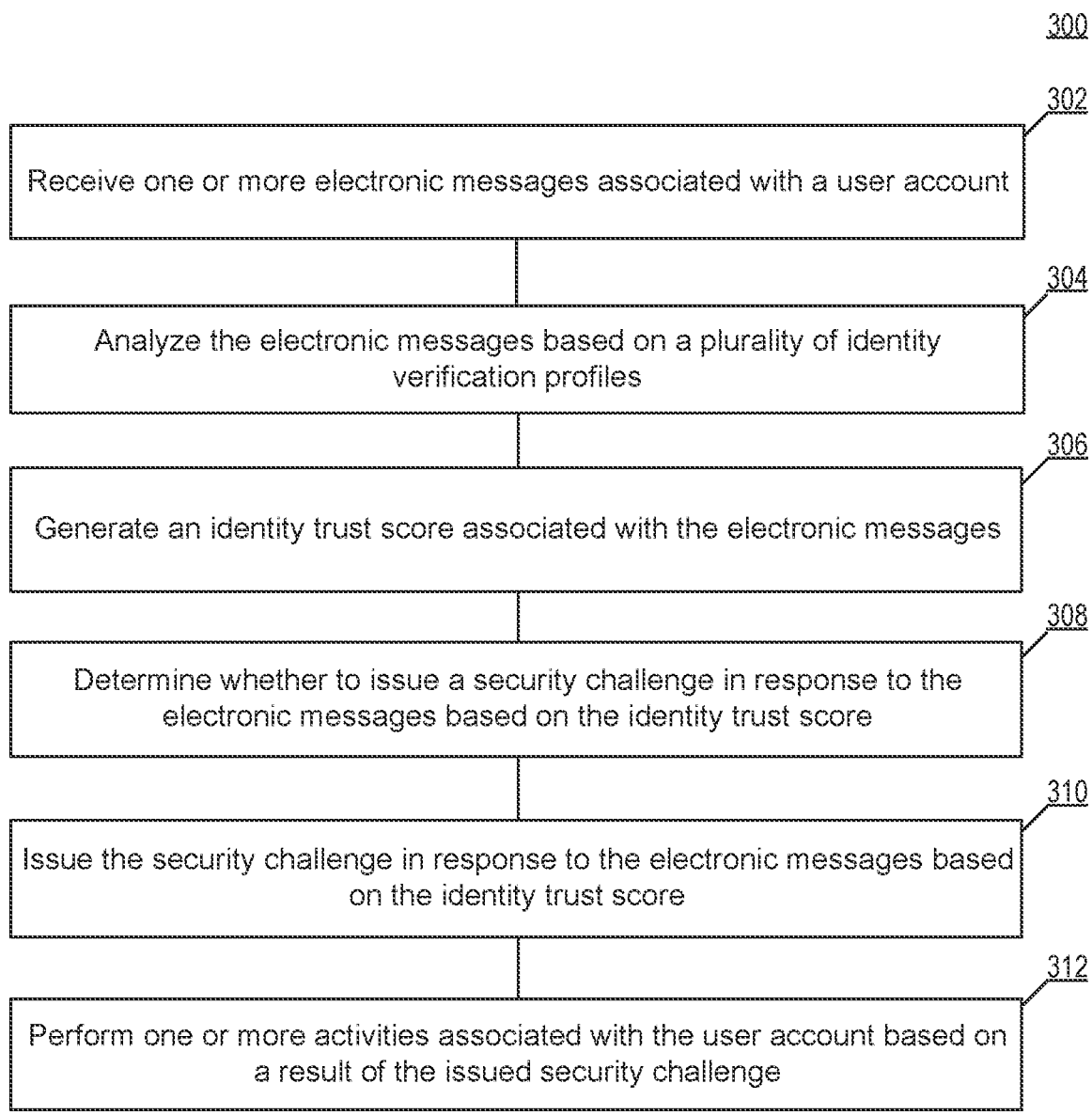
FIG. 3 is a flow diagram for providing identity verification for online communications, in accordance with examples of the present disclosure.

FIG. 3. is a flow diagram for providing identity verification for online communications. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof.

Method 300 begins at block 302 when communication security manager 132 of online identity verification system 130 receives one or more electronic messages associated with a user account. In some examples, communication security manager 132 receives one or more online communications in association with online communication system 124. For example, communication security manager 132 may receive various online communications from users in association with various respective user accounts in association with an online contact center. As such, online communications, such as online chat messages and/or email messages from users may flow through and/or be passed through online identity verification system 130.

At block 304, online identity verification system 130 analyzes the electronic messages based on a plurality of identity verification profiles. In various examples, one or more online messages generally may be received from various respective users separately and/or as part of respective online communication sessions. In addition, each of one or more online messages may be analyzed individually and/or collectively as part of a group of online messages.

In various examples, online communications of respective users are analyzed based on one or more identity verification profiles generated and maintained for the respective users. For example, each of one or more users may be associated with one or more of a communication profile, a grammatical profile, and/or a vernacular profile, for example, as described at blocks 204, 206, and 208. In some examples, online communications also may be analyzed based on one or more similar identity verification profiles associated with a group of user (e.g., a user community, similar users, all system users, etc.).

In some examples, communication security manager 132 determines which of one or more user identity verification profiles of a user to use based on any one or more of a user device, a user keyboard, a user location, and/or any other information associated with a user or a computing device that the user is using to send and receive online communications.

For example, communication security manager 132 may determine to use mobile communication, grammatical, and/or vernacular profiles maintained for a user to analyze online communications of a user when detecting any one or more of a mobile device, tablet, and/or touch input as part of an online communication session. In another example, communication security manager 132 may use a standard or default communication, grammatical, and/or vernacular profiles of a user when detecting a laptop, desktop, and/or full-size keyboard.

In various examples, communication security manager 132 analyzes incoming online messages associated with a user, for example, to determine if typing speed, typing rhythm, capitalization, grammar, sentence structure, and/or particular regional language previously seen in prior communications of the user are consistent or within acceptable statistical variations. Acceptable statistical variation for a user or a group of users may be based on any combination of one or more factors. (e.g., right handed, left handed, age, gender, hand size, device type, keyboard size, as compared to the general population, etc.).

In some examples, communication security manager 132 may compare an elapsed time and rhythm of a user typing their email address in an online message based on previous observations and/or averages stored in the user's communication profile. Such data may have been collected, for example, based on past online messages composed by the user, data collected during past user logins, data collected during one or more security challenges, and/or data collected during previous transactions associated with related websites or online services. In addition, other various data input, grammatical, and vernacular or language usage attributes as indicated at blocks 204, 206, 208 may be analyzed accordingly.

At block 306, online identity verification system 130 generates an identity trust score associated with electronic messages. In various examples, online identity verification system 130 generates an identity trust score based on the analyzing of the online messages at block 304. For example, an identity trust score generated for one or more online messages may be comprised of any combination of one or more identity verification profiles.

In various examples, online identity verification system 130 generates an identity trust sub-score in association with each of any one or more of a communication profile, a grammatical profile, a vernacular profile, a system security profile, and/or an account security profile used to perform online identity verification. For example, online identity verification system 130 may generate a communication profile score for a user based on how similar or dissimilar any combination of one or more measured or observed attributes of a user's communication profile are in comparison to the same attributes as measured or observed for incoming online messages associated with the user. In addition, online identity verification system 130 also may generate a grammatical profile score and a vernacular profile score for the incoming online messages associated with the user.

In various examples, scoring of individual attributes may or may not be weighted. In addition, attributes of online messages that are within an expected or acceptable range as indicated by profile data generally are viewed positively and usually will increase a computed sub-score and an overall trust score. On the other hand, attributes of online messages that are not within an expected or acceptable range as indicated by profile data generally are viewed as potentially suspicious and may decrease a computed sub-score and an overall trust score.

In some examples, system security manager 134 generates a system security score based on a system security profile associated with a user and/or a user's device. For example, system security manager 134 may increase or decrease the system security score computer in association with one or more online messages based on whether the online messages were sent from a device associated with the user's account or an unknown device, based on how many times a particular device has been seen, based on whether the device associated with the online messages is within a geolocation association with the user, based on whether the user of the device appears to be masking network or application identity information, based on whether communications from the device or the device itself appear to be association with a proxy service or an anonymity service, etc. In general, attributes of a system security score that indicate trust generally will be scored positively while attributes indicating unfamiliar devices, networks, device behavior, and/or concealment of information generally will be scored negatively when computing an overall system security score for one or more online messages.

In some examples, account security manager 136 generates an account security score based on an account security profile associated with a user account. For example, account security manager 136 may compute an account security score associated with one or more online communications based on the ability of an entity providing the online communications to verify one or more security related details of an associated user account accurately. For example, account security manager 136 may generate an account security score based on results of any number of security challenges associated with an online communication session and/or volunteered as part of the online communication session. As such, account security manager 136 generally may increase an account security score when a user is able to correctly respond to one or more security challenges, provide correct information regarding an associated account, provide correct information regarding one or more authorized users of an associated account, accurately provide secure details or responses to challenge questions, etc. On the other hand, account security manager generally may decrease an account security score when a user is unable to accurately respond to such challenges or provide such information.

At block 308, online identity verification system 130 determines whether to issue a security challenge and response to the electronic messages based on the identity trust score. In an example, online identity verification system 130 analyzes the generated identity trust score, one or more sub-scores comprising the identity trust score, and/or any combination of sub-score and/or other trust or fraud detection scores when performing online identity verification.

In various examples, online identity verification system 130 analyzes an identity trust score based on one or more thresholds. For example, one or more thresholds may indicate whether online communications associated with the user or user account are trusted, somewhat suspicious, very suspicious, and/or likely criminal activity. In some examples, one or more thresholds may be based on a level of service or amount of a transaction associated with online communications. For example, one or more thresholds may be relaxed to some extent when the topic of online messages is associated with answering simple customer service questions (e.g., lower risk). On the other hand, one of more thresholds may be elevated in association with large transaction amounts they above a given threshold and/or high-risk user account activities (e.g., higher risk).

In various examples, online identity verification system 130 analyzes an overall identity trust score generated in association with one or more online messages based on one or more thresholds. Online identity verification system 130 also may analyze each of one or more sub-scores used in generating the identity trust score based on respective thresholds. In addition, other scores not used in generating the identity trust score also may be analyzed based on additional respective thresholds.

In various examples, online identity verification system 130 determines whether an identity trust score meets, exceeds, and/or falls below a threshold defining an acceptable level of trust. Online identity verification system 130 also may determine whether an identity trust score, meets, exceeds, and/or falls below a threshold defining an acceptable level of risk. In some examples, any weighted and/or un-weighted combination of one or more sub-scores, such as a communication profile score, a grammatical profile score, a vernacular profile score, a system security profile score, an account security profile score, and/or any one or more other scores may be analyzed based on one or more thresholds to determine whether to verify that online messages received in association with a user and/or user account may be trusted or may need further verification.

In various examples, online identity verification system 130 may generate and/or evaluate various scoring attributes, identity trust scores, identity trust sub-scores, and/or other scores based on one or more security models. Security models generally refer to any one or more rule-based, statistical, and/or machine learning models used to analyze various scoring attributes and/or scores. In some examples, each of one or more different security models may include any combination of rules, statistical analysis (e.g., cluster analysis, regression analysis, Jaccard coefficients, Kulczynski coefficients, etc.), and/or machine learning to evaluate and/or score various observations. In addition, such models may be supervised or unsupervised.

In various examples, online identity verification system 130 determines that one or more online communications have been received from an authorized user of a user account based on determining that an identity trust score, and/or any combination of sub-scores meets and/or exceeds an appropriate level of trust without falling into an unacceptable range of suspicion or risk as defined by one or more appropriate thresholds.

In various examples, online identity verification system 130 determines to issue one or more security challenges in response to one or more online communications based on an identity trust score, and/or any combination of one or more sub-scores indicating an unacceptable level of uncertainty, a lack of trust, a high degree of risk, and/or criminal activity based on one or more thresholds. For example, online identity verification system 130 may generate and issue one or more the security challenges based on one or more deficiencies associated with one or more sub-scores used to compute an identity trust score.

At block 310, online identity verification system 130 issues the security challenge and response to the electronic message based on the identity trust score. Security challenges generally refer to one or more requests for a user to provide and/or verify information (e.g., personal information, account information, security information, passcode, security questions) and/or to perform one or more activities in response to a request.

As such, security challenges may be presented to a user as one or more challenge response tests to determine whether or not the user is human and/or whether or not the user is who they claim to be or otherwise authorized to perform account activities. In some examples, a user may be asked to verify one or more pieces of information and/or answer security questions within or outside of an online communication session. A user also may be asked to perform one or more activities, such as type special characters to confirm use of a particular keyboard and/or device, solve one or more puzzles, respond to one or more CAPTCHAs and/or reCAPTCHAS, etc.

In various examples, online identity verification system 130 generates one or more security challenges based on observed deficiencies in any combination of one or more identity trust score sub-scores and/or particular anomalous attributes comprising such sub-scores (e.g., perfect typing, unexpectedly atrocious grammar, sudden use of new vernacular never seen from the user before, etc.). For example, a security challenge may be designed to test or re-test one or more deficiencies observed in online communications from a user.

In an example, a security challenge designed to test typing speed, typing rhythm, various other typing metrics, capitalization grammar, and vernacular may ask a user to write a few sentences about their favorite soft drink. As such, online identity verification system 130 may use a response to a security challenge to evaluate, re-evaluate, and/or augment previous analysis of online communications in one or more areas (e.g., typing, communications, grammar, vernacular usage, etc.). In other examples, an online security challenge may ask a user to type and/or retype one or more familiar words or strings of text (e.g., one or more subcomponents of an email address, one or more sub components of an address, a city, a state, etc.). Online identity verification system 130 then may analyze one or more user typing metrics, accuracy, and rhythm based on an existing profile.

In various examples, online identity verification system 130 adjusts an identity trust score based on analyzing results of one or more security challenges. For example, online identity verification system 130 may increase or decrease an identity trust score and/or any one or more sub-components of an identity trusts score based on one or more evaluated aspects of a response (e.g., accuracy, inaccuracy, typing, communication, grammar, vernacular usage, etc.). Online identity verification system 130 then may continue generating and issuing one or more security challenges until identity trust score and/or any associated sub-component meet or exceed acceptable levels as defined by one or more thresholds.

In some examples, online identity verification system 130 may issue and generate one or more security challenges up to a threshold number (e.g., 1, 2, 3, 4, 5, etc.), for example, before ending an online communication session, requiring a user to call a customer service agent, and/or before performing one or more security-related actions associated with a user account. In some additional examples, online identity verification system 130 may provide a verifying user (e.g., online service agent) or friendly bot with an identity trust score and/or one or more associated sub-scores during an online communication session. In addition, provided scores may be displayed and updated in real-time or near-real time and/or associated with one or more descriptive labels and colors (e.g. trusted—green, suspicious,—yellow, bot—orange, criminal—red, etc.)

Further, in some examples, online identity verification system 130 generates and issues one or more security challenges automatically within and/or outside of an online communication session. In some additional examples, online identity verification system 130 may generate one or more security challenges with partial or full assistance from a verifying user, friendly bot, and/or online customer service agent. In addition, online identity verification system 130 may prompt a verifying entity to issue one or more security challenges and/or to select one or more suggested security challenges to be issued within and/or outside of an online communication session.

At block 312, online identity verification system 130 performs one or more activities associated with the user account based on a result of the issued security challenge. In some examples, online identity verification system 130 may warn or alert a friendly bot, human agent, and/or any other type of verifying entity managing an online communication session of potential fraudulent activity, temporarily lock or disable an account, limit one or more aspects of permitted transactions involving a user account (e.g., number, frequency, size, value, activity, etc.), terminate an online communication session, block one or more future online communication sessions associated with suspicious networks, devices, or activity, and/or switch from a friendly bot to a human agent when receiving an incorrect response to one or more security challenges or based on classifying online communications as being associated with a web robot.

In some examples, online identity verification system 130 may verify and allow an online communication session to proceed without interruption after receiving one or more correct responses to security challenges after verifying that activity associated with online communication messages and/or an online communication session can be trusted. In an additional example, online identity verification system 130 may automatically transition control of an online communication session from a human agent to a friendly bot after determining that online communications are associated with a trustworthy or authorized source.

Figure 4:
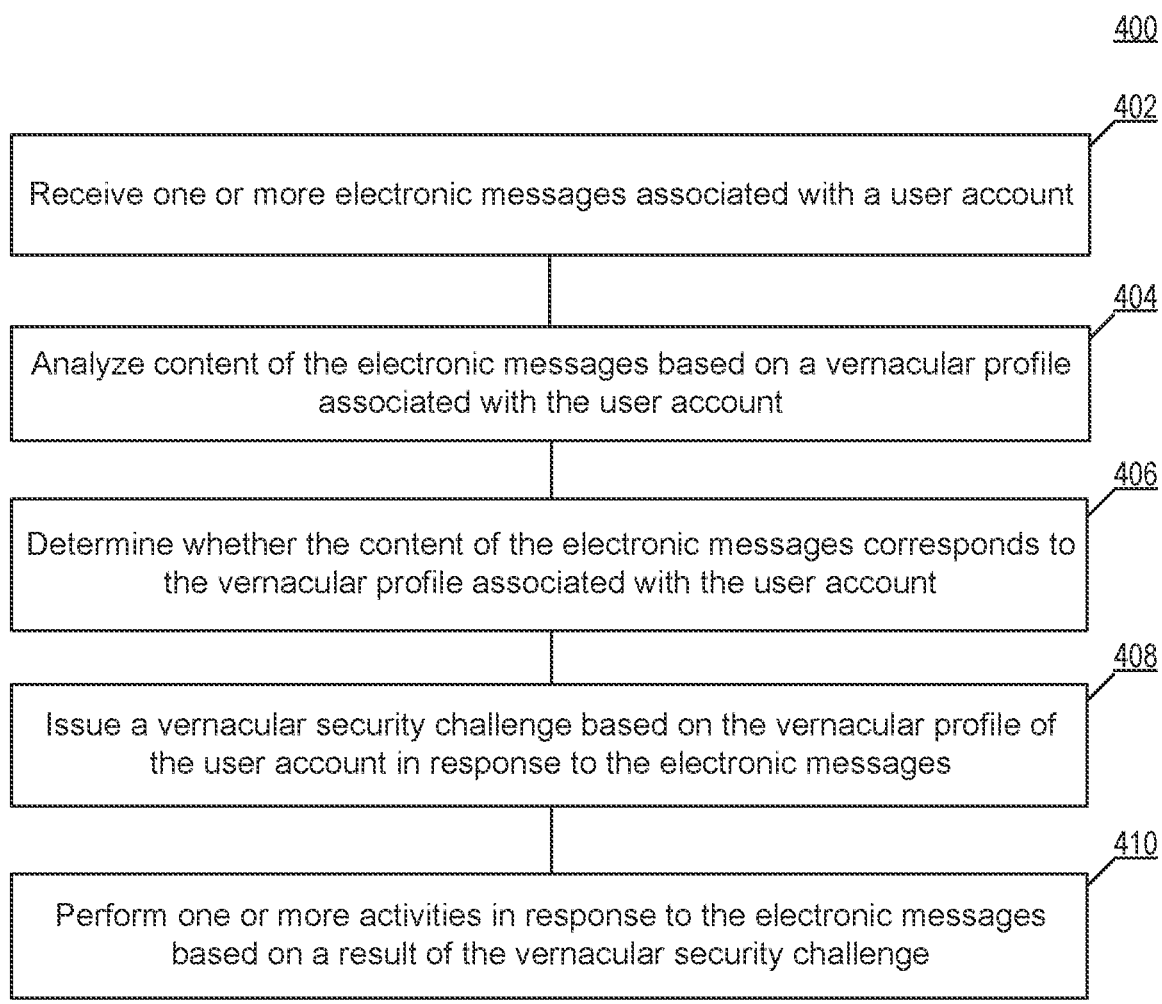
FIG. 4 providing verification for online communications based on significant language authentication, in accordance with examples of the present disclosure.

FIG. 4 is a flow diagram for providing verification for online communications based on significant language authentication. The method 400 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof.

Method 400 begins at block 402 when communication security manager 132 of online identity verification system 130 receives one or more electronic messages associated with the user account. User information generally has become increasingly available to cybercriminals in recent years. For example, users may intentionally and/or accidently share details of their lives online and in social media posts. As such, many general pieces of information about a user may be accessible online. This information may include, for example, a user's first pet, birthplace, a first car, favorite food, and other information that may assist a cybercriminal in answering security questions or otherwise impersonating a user. Various forms of private information also may be accessible to cybercriminals, for example, based on one or more detected and/or undetected security breaches.

In various examples, communication security manager 132 of online identity verification system 130 generally may provide one or more passive layers of vernacular security alone or in combination with other layers of security (e.g., data input metrics, communication style, grammar, system security, account security, etc.). For example, communication security manager 132 may receive and maintain a list of vernacular keywords to monitor written and/or verbal communications of users. In an example, communication security manager 132 may monitor use of words in online communications of users that describe concepts, such as miniature river crustaceans (e.g., crawdads, crayfish, crawfish), a sweetened carbonated beverage (e.g., soda, pop, cola, coke, etc.), a group of people (e.g., yinz, y'all, you guys, youse, etc.), food (e.g., coleslaw, slaw), etc. Communication security manager 132 also may analyze the context in which certain vernacular keywords are used. For example, communication security manager 132 may determine whether a user refers to any one or more of American football or soccer using the word "football."

In various examples, communication security manager 132 may maintain one or more regional vernacular dictionaries and/or one or more user-specific vernacular dictionaries to analyze various types of vernacular speech, colloquialisms, and/or slang used by various users in association with one or more geographic regions (or otherwise). For example, communication security manager 132 may collect, receive, and/or otherwise maintain information about how users from each of one or more different geographic regions (e.g., countries, regions, counties, cities, states, etc.) generally refer to one or more vernacular keywords. Such data may include statistics indicating a predicted likelihood of how someone from a particular geographic region could refer to each of one or more vernacular keywords (e.g., geographic region: x, vernacular keyword likelihood: soda 60%, coke 30%, and pop 10%). Such data also may be computed and/or otherwise determined, for example, based on a radius or areas surrounding a geographic location.

In various examples, communication security manager 132 may maintain one or more user-specific vernacular dictionaries that track how the user has historically referred to vernacular keywords in the past. A user-specific vernacular dictionary may be associated with one or more geographic areas based on one or more current and/or prior addresses associated with a user or an account. A user-specific vernacular dictionary also may automatically associate a user and/or a user account with one or more geographic regions automatically based on analyzing online communications of a user (e.g., where a user has provided a writing sample for enhancing one or more layers of passive security, where a user has opted in to sharing communications to improve account security using one or more layers of passive security, etc.), based on one or more user preferences, and/or based on one or more user selections. User-specific dictionaries also may track one or more languages used by the user over time and a user's proficiency communicating in each one of the languages (e.g., writing, voice).

In various examples, communication security manager 132 receives one or more incoming online messages associated with the user or a user account in association with online communication system 124. For example, online messages may include, and are not limited to, online chat session messages, email messages, text messages, social media messages, messages associated with online services, such as online payments, shipments, transactions, etc. As such, passive vernacular security and/or any type of online identity verification performed by online identity verification system 130 generally is not limited to receiving, analyzing, and/or processing any one or more types of electronic messages.

At block 404 communication security manager 132 of online identity verification system 130 analyzes content of electronic messages based on a vernacular profile associated with the user account. In some examples, communication security manager 132 analyzes one or more online chat sessions, one or more online messages, and/or one or more email messages associated with a user or a user account. For example, communication security manager 132 may analyze online chat sessions and associated messages to determine whether the user controlling the session and sending the messages is in fact a claimed or authorized user. Communication security manager 132 also may analyze email messages to determine whether the messages have originated with a particular user. In addition, any one or more types of passive security discussed in the present disclosure may be applied to email and other electronic communications, for example, to tag, prioritize, flag, and/or score such messages. For example, such processing may be performed for any session-based and/or independent communications as part of spam detection, network intrusion detection, and/or for any one or more other security related purposes.

In various examples, communication security manager 132 analyzes one or more online communications based on one or more geographic vernacular dictionaries and/or one or more user-specific vernacular dictionaries. For example, communication security manager 132 may detect one or more vernacular keywords within each of one or more online communications associated with the user. Communication security manager 132 then may compare usage of the vernacular keywords to general geographic usage based on one or more current and/or past addresses or geographic regions associated with a user and/or user account. Communication security manager 132 also may compare usage of the vernacular keywords to one or more user-specific vernacular dictionaries that indicates how user has expressed vernacular language in prior communications. In addition, communication security manager 132 also may update one or more vernacular dictionaries based on such online communications for example, for example to increase accuracy of vernacular dictionaries over time.

At block 406, communication security manager 132 of online identity verification system 130 determines whether the content of the electronic messages corresponds to the vernacular profile associated with the user account. In various examples, communication security manager 132 determines whether each of one or more online communication sessions and/or online messages correspond to one or more vernacular dictionaries associated with a user or a user account. For example, communication security manager 132 may determine whether each of one or more uses of vernacular keywords match one or more geographic vernacular dictionaries associated with a user and/or one or more user-specific geographic vernacular dictionaries. Such correspondence or lack thereof and any degree may be reflected in a vernacular profile score for online messages indicating how closely vernacular word usage within the messages matches or does not match prior communications of a user. For example, such scoring may be based on a percentage of expected vernacular word matches and/or misses.

In some examples, vernacular keywords present in online communications associated with the user are compared to expected vernacular usage in one or more vernacular dictionaries. For example, a user that has lived in the north and is living in the south based on account information and/or prior address information, may be associated with a vernacular dictionary of the north and a vernacular dictionary of the south. In addition the user also may be associated with a user-specific vernacular dictionary that indicates how the user has specifically referred to one or more various different vernacular keywords in the past. As such, detection of unusual vernacular word usage associated with one or more geographic areas that are not associated with a user or user account and have never been observed in communications with the user generally may be considered suspicious.

In an example, if a user has lived half of their life in the north and is living half of their life in the south, the user possibly may be expected to utilize a mix of vernacular from both regions. In an additional example, if the user has lived their entire life in the south and the user possibly may be expected mainly to utilize vernacular language and words from the south. In addition, any one or more specific users may use a unique combination of vernacular words from any one or more geographic locations where the users have lived, travelled, and/or may have been associated with. In some examples, one or more users may use highly distinctive combinations of vernacular keywords. For example, one user may refer to soft drinks as tonic, to sprinkles as jimmies, and to small crustaceans as "craw daddies," which would be reflected in a user-specific vernacular dictionary for that user and, in some examples, may distinguish that particular user from a significant percentage of the other users.

At block 408, communication security manager 132 of online identity verification system 130 issues a vernacular security challenge based on the vernacular profile of the user account in response to the electronic messages. In various examples, communication security manager 132 may determine that vernacular word usage present in online communications associated with the user are somewhat, extremely, and/or completely inconsistent with prior vernacular word usage observed from the user in previously communications. For example, communication security manager 132 may determine that new incoming online communications from the user exhibit or include vernacular word usage associated with another country, region, or place where a user has never lived and/or that a user has never visited (e.g., geographic locations where a user has weak ties and/or links based on prior history, geographic proximity, familial relations, etc.). In such examples and/or in any example where a security challenge is to be issued to a user for any reason, the security challenge may include one or more aspects that poll or otherwise test a user's vernacular word usage.

In various examples, communication security manager 132 may generate one or more different vernacular security challenges that may be presented to a user at once, consecutively, and/or generally at any time, in an order, and in any arrangement. For example, communication security manager 132 may present the textual, visual, or any representation of a vernacular keyword that may be referenced differently across any two or more geographic areas or any two or more groups of users.

In an example, communication security manager 132 may present an image of a soft drink to a user and allow the user to indicate a word for the picture by typing a name into a text field, selecting a name for one or more presented labels, or providing a name for the image for voice input. In addition, communication security manager 132 also may present other images that are associated with the other different vernacular keywords. User responses then may be compared to one or more geographic and/or user-specific vernacular dictionaries, a vernacular consistency, and/or inconsistency score then may be computed for the security challenge, and based on the result communication security manager 132 may determine whether the vernacular word usage exhibited by user in online communications and/or one or more security challenges meets or exceeds an acceptable level of trust based on a threshold (e.g., 80% success, 90% success, etc.). In general, online communications that are consistent with prior user language and vernacular usage of a user generally may be verified as trusted and/or authentic, and also may be allowed to continue. On the other hand, online communications that are suspicious may be presented with additional security challenges, maybe filtered or flagged, and may be further analyzed based on additional security related information.

At block 410, communication security manager 132 of online identity verification system 130 performs one or more activities in response to electronic messages base on a result of the vernacular security challenge. In some examples, communication security manager 132 updates or computes an identity trust score for a user session and/or one or more online messages based on a result of a vernacular security challenge and/or generally any other vernacular scoring associated with online communications. In some additional examples, communication security manager 132 may warn or alert a friendly bot, human agent, a spam detection system, an intrusion detection/system, and/or any other type entity analyzing incoming electronic messages associated with online communication system 124 of suspicious and/or fraudulent activity, temporarily lock or disable a user's account, limit one or more aspects of permitted transactions involving a user account (e.g., number, frequency, size, value, activity, etc.), terminate an online communication session, filter one or more online messages, block one or more future online communication sessions and/or online messages associated with suspicious networks, devices, or activity, and/or switch from a friendly bot to a human agent.

Figure 5:
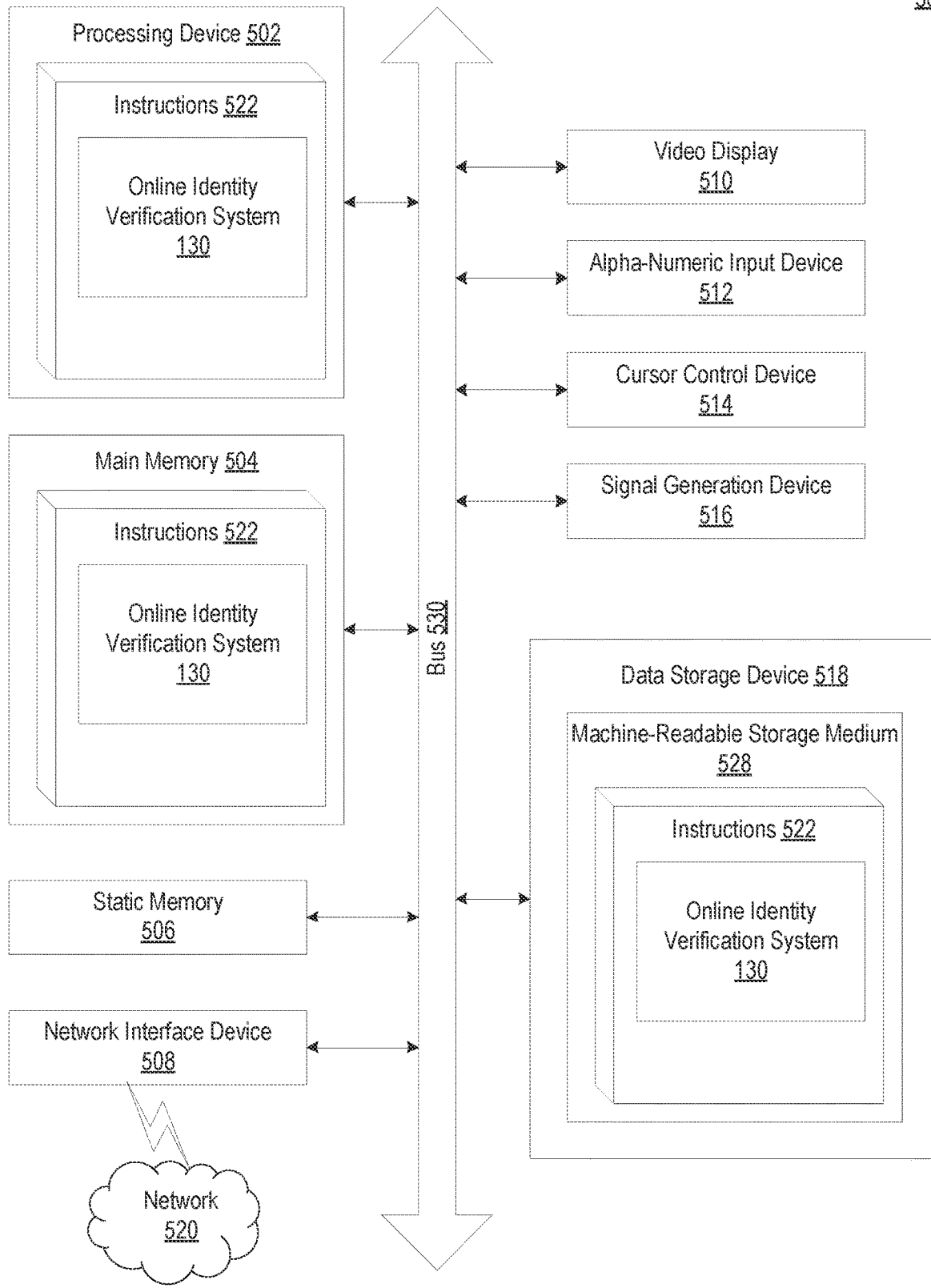
FIG. 5 is a block diagram of an exemplary computer system that may perform one or more of the operations described herein.

FIG. 5 illustrates a diagram of a machine in the exemplary form of a computer system 500, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 also may be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 also may include a network interface device 508. The computer system 500 may further include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software computer instructions) embodying any one or more of the methodologies or functions described herein. The instructions 522 also may reside, completely or at least partially, within the main memory 504 and/or within the processor 502 during execution thereof by the computer system 500, the main memory 504 and the processor 502 also constituting computer-readable storage media. The instructions 522 may be transmitted or received over a network 520 via the network interface device 508.

In one example, the instructions 522 include instructions for one or more modules of a risk detection system (e.g., online identity verification system 130 of FIG. 1) and/or a software library containing methods that call integration issue resolution system. While the computer-readable storage medium 528 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A system comprising:
   one or more processors; and
   one or more machine-readable storage media having instructions stored thereon that, in response to being executed by the one or more processors, cause the system to perform operations comprising:
   receiving, by a communication security manager, an electronic message associated with a user account;
   analyzing, by an online identity verification manager, content of the electronic message based in part on a vernacular profile associated with a user account;
   determining the content analyzed is associated with a vernacular profile corresponding to the user account;
   issuing a vernacular security challenge based on the vernacular profile corresponding the user account; and
   performing at least one activity in response to the electronic message based on a result from the vernacular security challenge issued.

2. The system of claim 1, wherein the determining is based in part on a regional vernacular dictionary associated with a geographic region.

3. The system of claim 1, wherein the operations further comprise:
   managing, by the communication security manager, a regional vernacular dictionary, wherein
   the managing includes statistics indicating likelihood of vernacular keywords.

4. The system of claim 1, wherein the content analyzed includes one of an online chat message and a social media message.

5. The system of claim 1, wherein analyzing the content of the electronic message includes determining if the electronic message originates from an authorized user.

6. The system of claim 1, wherein the operations further comprise:
   analyzing, by the communication security manager, one or more online communications based on geographic vernacular dictionaries; and
   updating the geographic vernacular dictionaries with one or more vernacular keywords detected in response to the analyzing.

7. The system of claim 1, wherein the vernacular security challenge includes a presentation of an image with a corresponding vernacular names for the image.

8. A method comprising:
   receiving, by a communication security manager, an electronic message associated with a user account;
   analyzing, by an online identity verification manager, content of the electronic message based in part on a vernacular profile associated with a user account;
   determining the content analyzed is associated with a vernacular profile corresponding to the user account;
   issuing a vernacular security challenge based on the vernacular profile corresponding the user account; and
   performing at least one activity in response to the electronic message based on a result from the vernacular security challenge issued.

9. The method of claim 8, wherein the determining is based in part on a regional vernacular dictionary associated with a geographic region.

10. The method of claim 8, further comprising:
    managing, by the communication security manager, a regional vernacular dictionary, wherein
    the managing includes statistics indicating likelihood of vernacular keywords.

11. The method of claim 8, wherein the content analyzed includes one of an online chat message and a social media message.

12. The method of claim 8, wherein analyzing the content of the electronic message includes determining if the electronic message originates from an authorized user.

13. The method of claim 8, further comprising:
analyzing, by the communication security manager, one or more online communications based on geographic vernacular dictionaries; and
updating the geographic vernacular dictionaries with one or more vernacular keywords detected in response to the analyzing.

14. The method of claim 8, wherein the vernacular security challenge includes a presentation of an image with a corresponding vernacular names for the image.

15. A non-transitory machine-readable medium having stored thereon machine-readable instructions executable to cause a machine to perform operations comprising:
receiving, by a communication security manager, an electronic message associated with a user account;
analyzing, by an online identity verification manager, content of the electronic message based in part on a vernacular profile associated with a user account;
determining the content analyzed is associated with a vernacular profile corresponding to the user account;
issuing a vernacular security challenge based on the vernacular profile corresponding the user account; and
performing at least one activity in response to the electronic message based on a result from the vernacular security challenge issued.

16. The non-transitory machine-readable medium of claim 15, wherein the determining is based in part on a regional vernacular dictionary associated with a geographic region.

17. The non-transitory machine-readable medium of claim 15, further comprising:
managing, by the communication security manager, a regional vernacular dictionary, wherein
the managing includes statistics indicating likelihood of vernacular keywords.

18. The non-transitory machine-readable medium of claim 15, wherein the content analyzed includes one of an online chat message and a social media message.

19. The non-transitory machine-readable medium of claim 15, wherein analyzing the content of the electronic message includes determining if the electronic message originates from an authorized user.

20. The non-transitory machine-readable medium of claim 15, further comprising:
analyzing, by the communication security manager, one or more online communications based on geographic vernacular dictionaries; and
updating the geographic vernacular dictionaries with one or more vernacular keywords detected in response to the analyzing.

\* \* \* \* \*